T. W. ROSS.
DENTAL POST EXTRACTOR.
APPLICATION FILED FEB. 27, 1911.
1,021,893.
Patented Apr. 2, 1912.
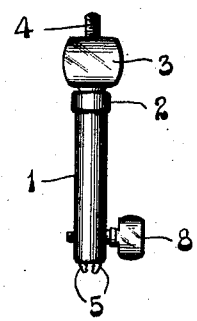
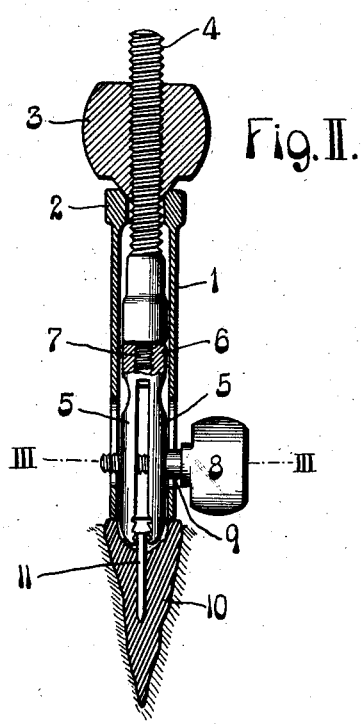
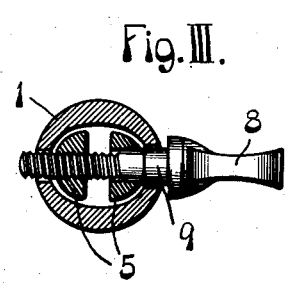
Attest
A. J. McCauley
E. B. Lunn
Inventor:
Thomas W. Ross,
by Knight & Cook
Att'ys

UNITED STATES PATENT OFFICE.

THOMAS W. ROSS, OF ST. LOUIS, MISSOURI.

DENTAL POST-EXTRACTOR.

1,021,893.   Specification of Letters Patent.   Patented Apr. 2, 1912.

Application filed February 27, 1911. Serial No. 611,039.

*To all whom it may concern:*

Be it known that I, THOMAS W. ROSS, a citizen of the United States of America, residing in the city of St. Louis and State of Missouri, have invented certain new and useful Improvements in Dental Post-Extractors, of which the following is a full, clear, and exact description, reference being had to the accompanying drawings, forming part of this specification.

My invention relates to an improvement in dental post extractors and has for its object to provide a simple, compact and efficient means for removing from the root of a tooth, from which the crown has broken off, the anchor post left therein so that a new post may be inserted, for the new crown to be mounted on the root of the tooth.

Another object of my invention is to provide a device of this character so designed that each of its several parts are made detachable and replaceable, so that if one of the parts should break it may be replaced at a small cost as compared with the complete device.

Figure I is a side elevation of my invention. Fig. II is an enlarged longitudinal view, partly in section, showing my device mounted upon the root of a tooth. Fig. III is an enlarged detail view, partly in cross section, taken on line III—III, Fig. II.

In the accompanying drawings: 1 designates a sleeve having a collar or enlarged portion 2 at one of its ends, the bore through said collar being of less diameter than the bore through the sleeve 1. The bore through the collar 2 is preferably tapered outwardly at the outer end of said collar to provide a seat for a tapered wing-nut 3 which is threaded upon a post 4 passing through the bores in the collar 2 and sleeve 1.

5 designates a pair of spring jaws integrally joined together at their inner ends, as seen at 6. This end is provided with a threaded opening for the reception of the threaded inner end 7 of the post 4. The spring jaws 5 are perforated substantially midway of their length, the perforation in one of said jaws being threaded. The outer ends of these jaws are serrated on their opposite faces to provide a positive gripping surface.

8 designates a thumb screw, provided with a shoulder 9, said screw passing loosely through a slot provided in the side of the sleeve 1, and through the unthreaded perforation in one of the spring jaws 5, the shoulder 9 resting against the outside of this jaw; and the screw 8 is threaded through the opposite threaded perforation in the other of the spring jaws 5, through which it may pass completely, and so another slot is provided in the sleeve 1 diametrically opposite the slot first mentioned to allow the thumb screw 8 to enter the perforations in the spring jaws 5. These slots provide a slideway for the said thumb screw 8.

10 designates the root of a tooth having a broken crown anchor post 11 therein, and which my device is adapted to remove.

The operation of my device is as follows: The wing nut 3 about the post 4 is unscrewed sufficiently to let the outer serrated edges of the spring jaws 5 project the desired distance beyond the end of the sleeve 1. The thumb screw 8 is then operated to allow the spring jaws 5 to move apart the required distance. The serrated ends of the spring jaws are then placed about the outer end of the anchor post 11 and are brought into positive gripping engagement therewith by the operation of the thumb screw 8. The end of sleeve 1 immediate of the serrated ends of the jaws 5 then rests upon the top of tooth 10. The wing nut 3 is then screwed downwardly into engagement with its tapered seat in the collar 2, and this operation being continued the post 4 is retracted from the sleeve 1, and the spring jaws 5 move with the post 4 by reason of the connection between said post and the inner end of said jaws. The anchor post 11 gripped between the serrated ends of the jaws 5 is pulled along with said jaws in their movement away from the tooth, thus extracting said post 11 from its anchorage in the tooth 10.

It will be noted that by reason of the small diameter of the outer ends of the jaws 5, when retracted, that I am enabled to project these ends into a cavity of comparatively small compass for the purpose of gripping the outer end of an anchor post broken off some distance below the surface of the tooth, by drilling a small cavity around said post for the reception of the ends of the jaws 5.

It is obvious that by making the several members of the device separate that should any part become broken, it can be detached and quickly replaced by a new piece at slight expense, without the necessity of securing an entire new post extractor.

I claim:—

1. A device of the character described comprising a sleeve, a threaded post operable in said sleeve, a nut arranged on said post and seated on one end of said sleeve for moving said threaded post with respect to said sleeve, spring jaws secured to said post and surrounded by said sleeve, said sleeve being provided with a longitudinal slot, and a clamping screw passing through said slot and fitted to said spring jaws to move them toward each other.

2. A device of the character described comprising a sleeve having an enlarged end provided with a tapered seat, a threaded post operable in said sleeve, spring jaws integrally joined together provided with serrated gripping faces and having a threaded portion by which they are connected to said post, a nut on said threaded post for moving said jaws with respect to said sleeve, said nut having a tapered end which is rotatably fitted to the tapered seat at the enlarged end of the sleeve, said sleeve being provided with two longitudinal slots located directly opposite each other, and a clamping screw passing through both of said slots and fitted to said serrated jaws to move them toward each other, said clamping screw having an enlarged unthreaded portion arranged within one of said slots and closely fitted to the sleeve so as to prevent the serrated jaws from turning during the operation of the said nut.

THOMAS W. ROSS.

In the presence of—
A. J. McCAULEY,
E. B. LINN.

---

Copies of this patent may be obtained for five cents each, by addressing the "Commissioner of Patents. Washington, D. C."